United States Patent
Ahner et al.

[19]

[11] Patent Number: 6,098,584
[45] Date of Patent: Aug. 8, 2000

[54] STARTER FOR AN INTERNAL COMBUSTION ENGINE

[75] Inventors: Peter Ahner, Boeblingen; Siegfried Schustek, Ditzingen; Manfred Ackermann, Oppenweiler; Martin Eisenhardt, Renningen; Robert Schenk, Schwieberdingen, all of Germany

[73] Assignee: Robert Bosch GmbH, Stuttgart, Germany

[21] Appl. No.: 09/155,118

[22] PCT Filed: Aug. 7, 1997

[86] PCT No.: PCT/DE97/01663

§ 371 Date: Sep. 22, 1998

§ 102(e) Date: Sep. 22, 1998

[87] PCT Pub. No.: WO98/20252

PCT Pub. Date: May 14, 1998

[30] Foreign Application Priority Data

Nov. 7, 1996 [DE] Germany ............. 196 45 943

[51] Int. Cl.[7] ........................... F02N 11/08
[52] U.S. Cl. .................... 123/179.3; 290/38 B
[58] Field of Search ............ 123/179.3, 179.22, 123/182.1, 196 AB; 180/165; 290/38 B

[56] References Cited

U.S. PATENT DOCUMENTS

| 4,346,773 | 8/1982 | Hofbauer et al. | 180/165 |
|---|---|---|---|
| 4,405,031 | 9/1983 | Rotter | 180/165 |
| 4,458,156 | 7/1984 | Maucher et al. | 290/38 B |
| 4,522,166 | 6/1985 | Toivio et al. | 123/196 A |
| 4,626,696 | 12/1986 | Maucher et al. | 290/38 R |
| 5,101,780 | 4/1992 | Jones | 123/182.1 |

FOREIGN PATENT DOCUMENTS

| 29 17 139 | 11/1980 | Germany . |
|---|---|---|
| 30 48 972 C2 | 1/1995 | Germany . |

*Primary Examiner*—Henry C. Yuen
*Assistant Examiner*—Arnold Castro
*Attorney, Agent, or Firm*—Michael J. Striker

[57] ABSTRACT

The starter apparatus for an internal combustion engine (2) includes a starter-generator including a device for rotating a flywheel (5) to a predetermined rotational speed and a device for rotating the crankshaft (3) of the engine to directly start the engine; at least one clutch (6, 7) for directly coupling or disengaging the flywheel (5) with the crankshaft (3) of the engine (2) so that the flywheel (5) starts the engine (2) with the rotational energy stored in the flywheel (5) by the starter-generator in an impulse starting method and a changeover device (11) for changing between the impulse starting method based on engagement of the flywheel (5) with the engine (2) and a direct starting method in which the starter-generator (4) is directly coupled to the engine, wherein the changeover device switches between the direct starting method and the impulse starting method as a function of a temperature of the engine (2) so that the impulse starting method is used at comparatively lower temperatures and the direct-starting method is used at comparatively higher temperatures. The starter apparatus also includes a device for adaptively determining the threshold for changeover between impulse starting and direct starting.

9 Claims, 1 Drawing Sheet

6,098,584

STARTER FOR AN INTERNAL COMBUSTION ENGINE

BACKGROUND OF THE INVENTION

1. Field of the Invention

The invention relates to a starter unit for an internal combustion engine having a starter and a flywheel which can be coupled to or disengaged from the crankshaft of the engine with at least one clutch.

2. Prior Art

This type of starter unit is described in Patent Abstracts of Japan, Vol. 007, No. 199 (JP-A-58 098 658), in which a starter is connected to the engine crankshaft via a pinion/toothed ring transmission.

For a starter system, there are essentially three main types of apparatus:

1. Conventional electrical starter.

Such a design, because of the relatively brief attainable total service life of the starter motor and in particular its pinion, its toothed ring, and its override clutch, as well as for noise reasons no longer leads to an embodiment with a promising future.

2. Starter-generator with direct starting.

Here the starter-generator is solidly connected to the crankshaft. In starting, it acts as the starter motor, which is supplied by a battery, while during operation it acts as a generator for charging the battery.

Because of the necessary starting energy and starting power (approximately 150 Nm to 200 Nm of cold-starting torque for a medium-priced automobile) it is not feasible to use a starter generator with a typical 12 to 24 V lead starter battery. Furthermore, the electric motor of the starter-generator would have to be enlarged by more than a factor of 3 compared with what is needed for the generator power, which among other effects would also lead to problems in terms of space. For starting an engine at operating temperature, such a starter-generator would be unambiguously oversized.

3. Starter-generator with impulse starting.

For impulse starting, with the engine (and transmission) disengaged, the flywheel is first rotated up to a cranking rpm. As the clutch rapidly closes, the flywheel then starts up the engine with rotational energy.

Recent vehicle concepts, optimized in particular with regard to environmental protection and fuel consumption, require the engine to be turned off at traffic lights; the current term for this is "start-stop mode". Moreover, the engine should be either merely disengaged, or preferably turned off entirely when the engine is in an overrunning phase; the latter is accomplished by what is known as an "automatic inertia utilization transmission".

An application of this modern technology, however, means that the number of starting cycles is increased by a factor of about 10, so that a starter that earlier was designed for 40,000 starting cycles not would have to withstand from 400,000 to 600,000 starting cycles. On the other hand, for reasons of comfort and also because an ever-greater number of electrically actuated accessories are being used, modern vehicles have a generator power that is higher by up to a factor of 5 (previously, 1 to 1.5 kW, and in future 5 kW and more). If the automatic inertia utilization transmission turns on frequently, still other problems arise in supplying the on-board electrical system.

In an embodiment according to German Patent DE 30 48 972 C2, the problem of generator power is solved in part by a generator installation on the crankshaft, between the engine and the flywheel; if a manual transmission is used, two clutches are then needed, which are advantageously disposed in front of and behind the flywheel. With such an arrangement, it is then possible with an automatic inertia utilization transmission to generate generator power.

Such an "impulse start" is suitable there for normal cold starts. For re-starts, however, of the kind done with the engine warm at a traffic light or at the end of an overrunning phase, it is unfavorable because of the time needed.

The same problem also exists in a design of the kind described in German Patent Disclosure DE 29 17 139. In this known starter unit, the centrifugal mass of the crankshaft can be engaged and disengaged, and on slowing down, braking or in overrunning the engine can be allowed to keep running by interrupting the drive train with a minimum rpm, such as the idling rpm. In brief stops, for instance when stopped at a traffic light, the drive train is also interrupted, but then the engine is turned off as well, while the flywheel continues to rotate and is then re-engaged via the clutch to restart the engine. It is also possible if the flywheel rpm has dropped too far to use an electric motor to increase the flywheel rpm again.

Overall, until now, in a crankshaft starter-generator concept, either an excessively high starting moment for the cold start, as a direct start system, was definitive for designing the electrical machine and various other electrical components, so that overall an appropriate compromise would not be found, or if a classical starter or an impulse starter was used, the demands for the re-starting with regard to starting time, low noise level, wear and service life, for the high demanded number of 400,000 cycles and more, could not all be attained.

SUMMARY OF THE INVENTION

The object of the invention is to overcome this disadvantage and to create a starter unit for an internal combustion engine that automatically selects the optimal starting method in all starting phases, and that can be changed over to the generator mode while the engine is running.

According to the invention a starter apparatus for an internal combustion engine comprises an starter-generator including means for rotating a flywheel to a predetermined rotational speed and means for rotating the crankshaft of the engine to directly start the engine without the flywheel;

at least one clutch for directly coupling or disengaging the flywheel with the crankshaft so that the flywheel starts the engine with the rotational energy stored in the flywheel by the starter-generator in an impulse starting method; and changeover means for changing between the impulse starting method based on engagement of the flywheel with the engine and a direct starting method in which the starter-generator is directly coupled to the engine, wherein the changeover means changes from the direct starting method and the impulse starting method as a function of a temperature of the engine so that the impulse starting method is used at comparatively lower temperatures and the direct-starting method is used at comparatively higher temperatures.

In the split according to the invention into different starting methods via the engine temperature, all the demands for a system designed for a high cycle number of 400,000 and more can be well-met. It is especially advantageous that an economical overall solution is found by means of a fast, low-noise direct start on the one hand and on the other by a somewhat more time-consuming but securely controllable alternative start; in conjunction with an automatic transmission, an overall arrangement with only one clutch is also feasible in the proposed version. It is particularly desirable that the start apparatus include means for triggering or controlling the starter-generator to reinforce a synchronization of the automatic transmission.

Advantageous further features of the subject of claimed invention will become apparent from the characteristics of the dependent claims and from the description and the drawing.

BRIEF DESCRIPTION OF THE DRAWINGS

Two exemplary embodiments of the invention are shown in the drawing and described in further detail in the ensuing description. In which.

DESCRIPTION OF THE EXEMPLARY EMBODIMENTS

Figure 1:
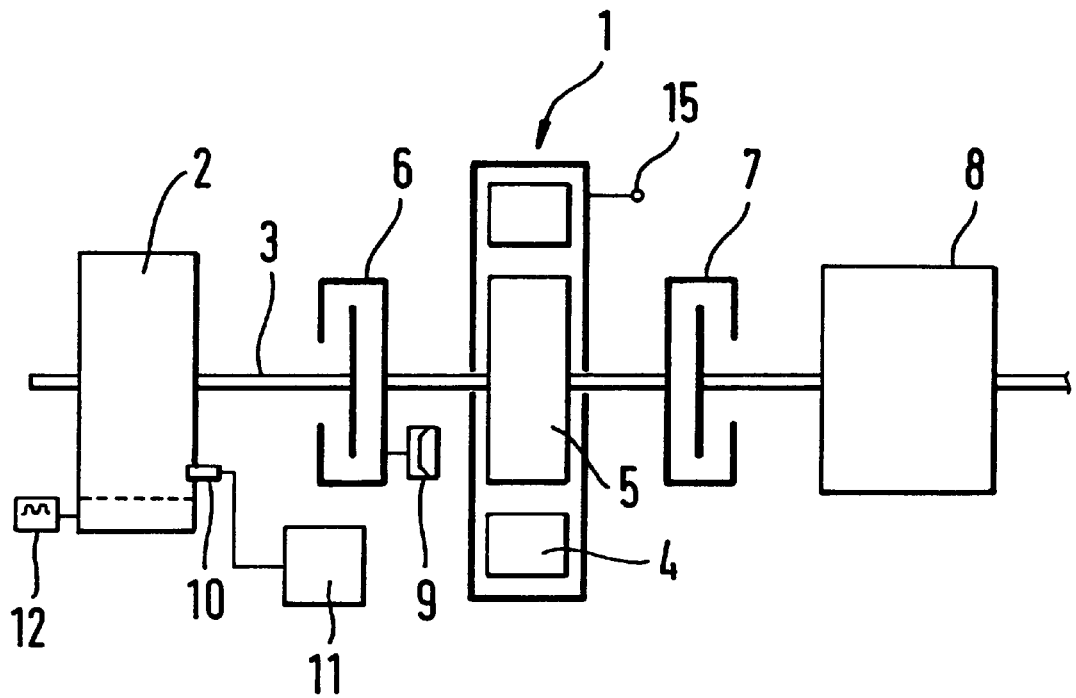
FIG. 1, is a cross-sectional diagrammatic view through a starter unit for use in a vehicle with a manual transmission.

A starter unit 1 for an internal combustion engine 2 engages a crankshaft 3 (drive shaft) and has a flywheel starter-generator 4, 5 with an electrical machine, not shown in further detail, comprising a stator and a rotor. Between the engine 2 and the flywheel starter-generator 4, 5, a first (normal) clutch 6 is provided. A second clutch 7 (drive clutch) is located between the flywheel starter-generator 4, 5 and a manual transmission 8. The clutch 6 is equipped with a fast-closing servo 9.

A temperature sensor 10 is mounted on the engine 2 and reports the current temperature to an electrical or electronic changeover device 11. The changeover device 11 sends temperature-dependent commands to the starter-generator 4, in order to set it either for direct starting or alternative starting (impulse starting) with flywheel energy. A latent heat store 12 may be provided on the engine 2, to preheat the motor oil.

The alternative start is undertaken with the engine stopped, when its temperature is below 50° C., for instance, and the direct start is done for temperatures for instance over 50° C. For the very much lower number of alternative starts (fewer than 200,000 cycles), an impulse start is performed, in which the starter-generator 4, with the engine 2 disengaged, first speeds up the flywheel 5 to a so-called "cranking speed" of about 1200 rpm and then with the fast-closing clutch 6 starts up the engine via the rotational energy of the flywheel 5, the transmission 8 remaining disengaged.

The requisite starting moment in the re-start is determined by the relatively low moments of friction and proportionately high compression and acceleration moments at high temperatures. The starting moment can be reduced by means of a preceding brief decompression phase. Since in a direct start this starting time is very brief (equal to 0.5 seconds or less), a brief overload on the electrical machine (starter-generator) is acceptable, resulting in a version that is optimized in terms of mass and installation space. In each case the starting operation is tripped by applying a starting signal to the input 15.

Figure 2:
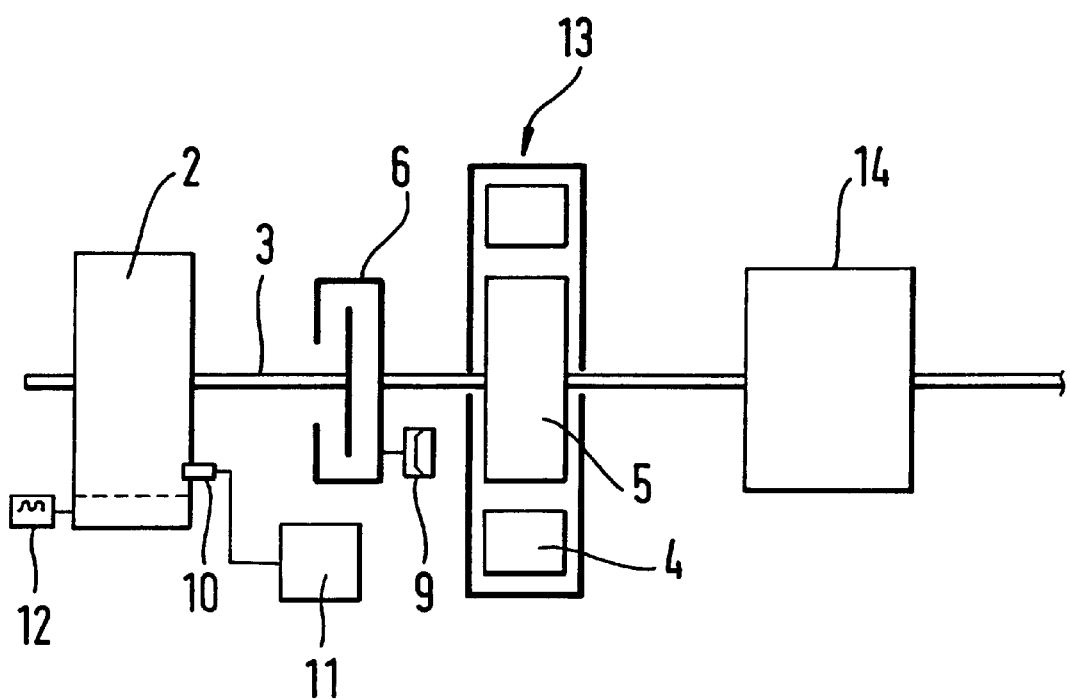
FIG. 2 is a cross-sectional diagrammatic view through, a starter unit for use in a vehicle with an automatic transmission.

FIG. 2, with the same reference numerals for corresponding elements, shows a similar starter unit 13 to that of FIG. 1. However, the second clutch 7 is omitted, because the transmission is embodied as an automatic transmission 14. The now full clutch 6 must be equipped with the dynamic servo 9 for the impulse starting. The control system must include gear synchronization and, on automatic gear shifting, a stabilization of the engine rpm; that is, the components used anyway in the automatic transmission 14 need merely be disposed differently and triggered in a somewhat more complicated way.

For both models of FIGS. 1 and 2, it is true that for the alternative start or impulse start the switchover from direct starting is dependent on the motor oil temperature and can be varied by preheating the motor oil, the consequence of which is to reduce the number of alternative starts. Such oil preheating could be performed by means of the latent heat store 12.

It is also conceivable to introduce a brief decompression phase to facilitate a direct start. It is also possible as an alternative start with the engine cold to perform the startup of the crankshaft 3 by way of the impulse start, that is, with the flywheel 5, and to reinforce the ensuing runup via the direct start.

It is also advantageous to make a cranking rpm for the impulse start dependent on the ambient temperature of the engine 2 or on the oil temperature.

In addition, a limit condition for the changeover from one starting method to the other can be ascertained adaptively.

Finally, in the use of the changeover device 11 of the invention, it is also important that in conjunction with the components of an automatic transmission 14, only a single clutch 6 is necessary for the starter unit 13. In a preferred embodiment of the invention the starter apparatus includes means for reinforcing a synchronization of the automatic transmission by triggering the starter-generator.

What is claimed is:

1. A starter apparatus for an internal combustion engine (2), said starter apparatus comprising
    a starter-generator (4) including means for rotating a flywheel (5) to a predetermined rotational speed and means for rotating the crankshaft (3) of the engine to directly start the engine;
    at least one clutch (6, 7) for directly coupling or disengaging the flywheel (5) with the crankshaft (3) of the engine (2) so that the flywheel (5) starts the engine (2) with the rotational energy stored in the flywheel (5) by the starter-generator in an impulse starting method;
    changeover means (11) for changing between the impulse starting method based on engagement of the flywheel (5) with the engine (2) and a direct starting method in which the starter-generator (4) is directly coupled to the engine; and
    means for adaptive determination of a threshold for changeover between said impulse starting method and said direct starting method;
    whereby said changeover means changes from the direct starting method and the impulse starting method as a function of a temperature of the engine (2) so that the impulse starting method is used at comparatively lower temperatures and the direct-starting method is used at comparatively higher temperatures.

2. The starter apparatus as defined in claim 1, wherein the means for rotating the crankshaft of the engine to directly start the engine by the starter-generator (4) comprises means for directly connecting the starter-generator (4) to the flywheel (5) to drive the flywheel (5) and wherein the crankshaft (3) is coupled to the flywheel (5).

3. The starter apparatus as defined in claim 1, wherein said engine contains motor oil and said temperature is a temperature of said motor oil, and further comprising means for preheating said motor oil so that the number of alternative starting cycles is reduced by the preheating of the motor oil.

4. The starter apparatus as defined in claim 3, wherein said means for preheating said oil preheating comprises a latent heat store.

5. The starter apparatus as defined in claim 2, further comprising means for setting up a brief decompression phase when the engine is started by the direct starting method.

6. The starter apparatus as defined in claim 3, further comprising means for combining the impulse starting method and the direct starting method so that the crankshaft (3) is rotated by the impulse starting method but at the same time further torque is applied to the crankshaft by means of the direct starting method, whereby at least one of an impulse start of the engine and an ensuing run-up is reinforced via the direct starting method.

7. The starter apparatus as defined in claim 1, further comprising means for adjusting a cranking speed of said crankshaft as a function of ambient conditions of the engine (2) during the impulse starting method.

8. The starter apparatus as defined in claim 1, further comprising an automatic transmission and wherein said at least one clutch (6, 7) consists of only a single clutch (6).

9. The starter apparatus as defined in claim 8, further comprising means for reinforcing a synchronization of the automatic transmission by suitable triggering of the starter-generator (4).

* * * * *